US012385535B2

(12) United States Patent
De Soccio

(10) Patent No.: US 12,385,535 B2
(45) Date of Patent: Aug. 12, 2025

(54) DISC BRAKE FOR RAILWAY VEHICLES

(71) Applicant: COFREN S.r.l., Avellino (IT)

(72) Inventor: Vittorio De Soccio, Avellino (IT)

(73) Assignee: COFREN S.r.l., Avellino (IT)

( * ) Notice: Subject to any disclaimer, the term of this patent is extended or adjusted under 35 U.S.C. 154(b) by 242 days.

(21) Appl. No.: 17/534,110

(22) Filed: Nov. 23, 2021

(65) Prior Publication Data

US 2022/0170523 A1    Jun. 2, 2022

(30) Foreign Application Priority Data

Nov. 27, 2020    (IT) .......................... 102020000028781

(51) Int. Cl.
*F16D 65/092* (2006.01)
*F16D 69/00* (2006.01)
*F16D 69/02* (2006.01)

(52) U.S. Cl.
CPC ......... *F16D 65/092* (2013.01); *F16D 69/026* (2013.01); *F16D 69/028* (2013.01); *F16D 2069/002* (2013.01)

(58) Field of Classification Search
CPC .. F16D 65/092; F16D 69/00; F16D 2069/002; F16D 69/026; F16D 69/028
See application file for complete search history.

(56) References Cited

U.S. PATENT DOCUMENTS

| 2,713,923 | A | * | 7/1955 | Eksergian | ........... | F16D 65/0037 |
| | | | | | | 188/251 A |
| 3,297,117 | A | * | 1/1967 | Freholm | ............. | F16D 69/0408 |
| | | | | | | 188/234 |
| 4,278,153 | A | * | 7/1981 | Venkatu | ................ | F16D 65/122 |
| | | | | | | 428/117 |
| 8,544,617 | B2 | * | 10/2013 | De Soccio | .......... | F16D 69/0408 |
| | | | | | | 188/235 |
| 2006/0151267 | A1 | * | 7/2006 | Russo | ................... | F16D 65/092 |
| | | | | | | 188/250 E |
| 2007/0267257 | A1 | | 11/2007 | Hiromasa | | |

(Continued)

FOREIGN PATENT DOCUMENTS

| CN | 102174946 A | 9/2011 |
| CN | 105909704 A | 8/2016 |

(Continued)

OTHER PUBLICATIONS

British Patent No. GB 2,219,365 to Katsuhiro et al published on Dec. 6, 1989.*

(Continued)

*Primary Examiner* — Pamela Rodriguez
(74) *Attorney, Agent, or Firm* — K&L Gates LLP

(57) ABSTRACT

A disc brake for railway vehicles comprising a pad and a disk on which the pad acts is provided. The pad comprises a base plate and a plurality of friction elements fixed to the base plate. The friction elements comprise first friction elements made of a first material and second friction elements made of a second material. The second material has a compressibility modulus (e.g., the pressure needed to compress the material by 1 mm) that is at least 5 MPa less smaller than the compressibility modulus of the first material. There may be more of the first friction elements than the second friction elements.

20 Claims, 4 Drawing Sheets

(56) References Cited

U.S. PATENT DOCUMENTS

| | | | | |
|---|---|---|---|---|
| 2012/0298458 | A1* | 11/2012 | Hiramatsu | B61H 5/00 |
| | | | | 188/73.31 |
| 2018/0017123 | A1* | 1/2018 | Elstorpff | F16D 65/092 |
| 2019/0101173 | A1* | 4/2019 | Mohseni | B33Y 80/00 |
| 2020/0332848 | A1 | 10/2020 | De Soccio | |

FOREIGN PATENT DOCUMENTS

| | | | |
|---|---|---|---|
| DE | 102012012876 A1 | 12/2013 | |
| EP | 2730798 A1 | 5/2014 | |
| GB | 2260173 A | 4/1993 | |

OTHER PUBLICATIONS

Translation of the text of previously cited German Patent No. DE 102012012876, the patent filed on Dec. 12, 2013.*
Italian Search Report completed Jul. 12, 2021 for corresponding Italian Patent Application No. 202000028781 (7 pages).

\* cited by examiner

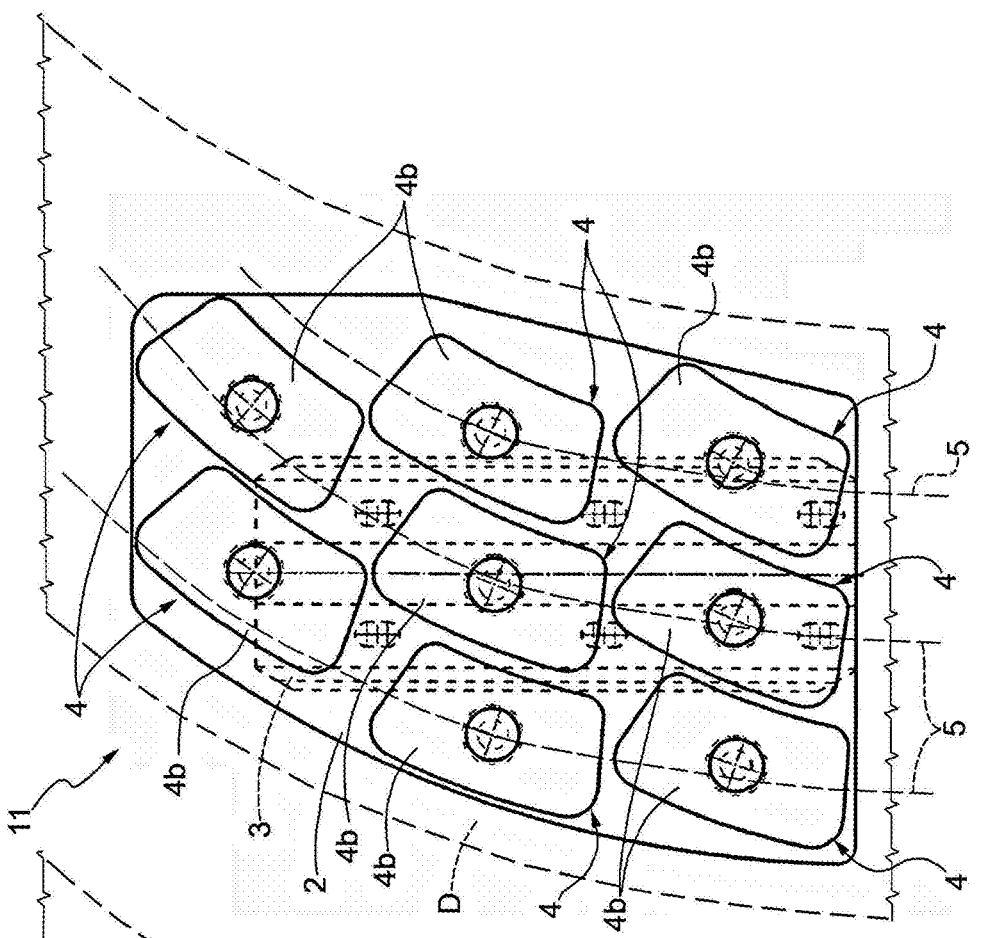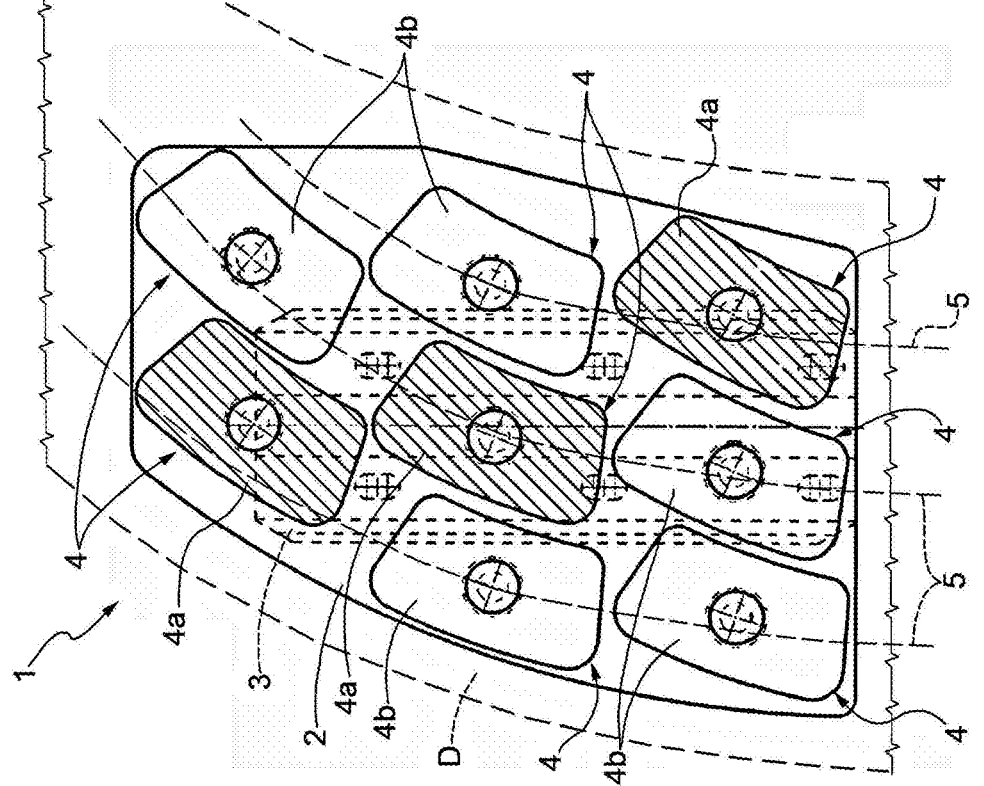

DISC BRAKE FOR RAILWAY VEHICLES

CROSS-REFERENCE TO RELATED APPLICATIONS

This Patent Application claims priority from Italian Patent Application No. 102020000028781 filed on Nov. 27, 2020, the entire disclosure of which is incorporated herein by reference.

TECHNICAL SECTOR

This invention relates to a disc brake for railway vehicles. In particular, this invention finds advantageous, but not exclusive, application with low- and medium-speed railway vehicles.

PRIOR ART

As is known, disc brakes are subject to great stress and, in order to obtain optimal braking action, it is necessary to have a good transmission of braking force from pad to disk.

For some time now, the sector has been oriented towards the use of pads comprising multiple friction elements of a smaller size, instead of a single friction element of a larger size. One of the solutions adopted in this regard, requires that each pad mainly consist of a main base plate and multiple friction elements fixed to the base plate. Generally, each of the friction elements is composed of one sheet metal and a friction insert permanently fixed to the sheet metal.

The solution relating to the use of multiple friction elements of a smaller size is advantageous both in terms of efficacy of pressure on the disk and, thus, of braking, and in terms of low noise. In this regard, it should be highlighted how low noise became an increasingly important discriminating factor in choosing which disc brake to use.

As can be easily imagined, the need to contain noise during braking is felt most for those trains that make a large number of stops, such as metros, regional trains, or intercity trains.

Many solutions that lead to a reduction in braking noise suffer from the disadvantage of entailing a lower transmission of braking force from the pad to the disk and, therefore, a reduction in the efficiency of the braking itself. In fact, as is obvious, trains that make many stops (low- and medium-speed trains), even if they do not reach very high speeds, must, in any case, be able to have a high degree of braking efficiency.

Here and below, the term "low- and medium-speed trains" means those trains whose maximum speed is 220 km/h.

Another particularly crucial requirement relating to brakes adopted on trains that make many stops, concerns a reduction in pollution in terms of fine dust produced during braking. In fact, the trains considered above repeatedly transit through and stop in areas with high population density, such as residential areas.

Generally, the solutions that lead to a reduction in braking noise suffer from the disadvantage of entailing a high release of fine powders.

Thus, the need was felt to provide a type of disc brake for low- and medium-speed trains, the technical features of which were such as to ensure low noise during braking, without, as a result, entailing disadvantages in terms of efficiency of braking and in terms of fine powders produced.

The inventor of this invention has provided a solution relating to a pad for disc brakes for low- and medium-speed trains, in which the simultaneous presence, according to particular conditions, of friction elements produced with materials with different compressibility moduli ensures that the requirement above is met in a surprising way.

SUBJECT OF THE INVENTION

The subject of this invention is a disc brake for railway vehicles comprising a pad and a disk on which the pad acts; said pad comprising a base plate and multiple friction elements fixed to the base plate; said friction elements comprising first friction elements made of a first material and second friction elements made of a second material; said disc brake being characterized in that said second material has a compressibility modulus (pressure needed to compress the material by 1 mm) smaller than the one of said first material by a value equal or greater to 5 Mpa, preferably 10 MPa; there being a higher number of said first friction elements than of said second friction elements.

It has been verified that a reduction in noise is already noticeable with a difference of 5 MPa in compressibility modulus. Beyond the difference of 10 MPa of compressibility modulus, the reduction in noise is even clearer.

Preferably, said friction elements are arranged in arched rows and, in use, basically overlapping with respective concentric lines of the disk on which the pad acts; each arched row comprising both said first friction elements and said second friction elements.

Preferably, in each of the arched rows, said first friction elements are either equal or greater in number to said second friction elements.

Preferably, said first material has a compressibility modulus of between 20 and 40 MPa, and said second material has a compressibility modulus of between 2 and 15 MPa.

Preferably, said first material is a sintered material and said second material is an organic material.

Preferably, the sintered material has a composition composed of: from 10 to 70% by weight of copper, from 5 to 40% by weight of iron, from 5 to 20% by weight of graphite, from 1 to 10% by weight of friction modifiers.

Preferably, the organic material has a composition composed of: from 5 to 30% by weight of rubber and resin, from 10 to 50% by weight of filler, from 5 to 20% by weight of graphite, from 5 to 20% by weight of friction modifiers.

BRIEF DESCRIPTION OF THE DRAWINGS

For a better understanding of the invention, one embodiment is included below, merely by way of non-limiting example, with the aid of the attached drawings, wherein:

FIG. 1 is a view from above, with transparent parts for clarity, of a pad that is the subject of this invention;

FIG. 2 is a view from above, with transparent parts for clarity, of a comparison pad;

PREFERRED EMBODIMENT OF THE INVENTION

Figure 3:
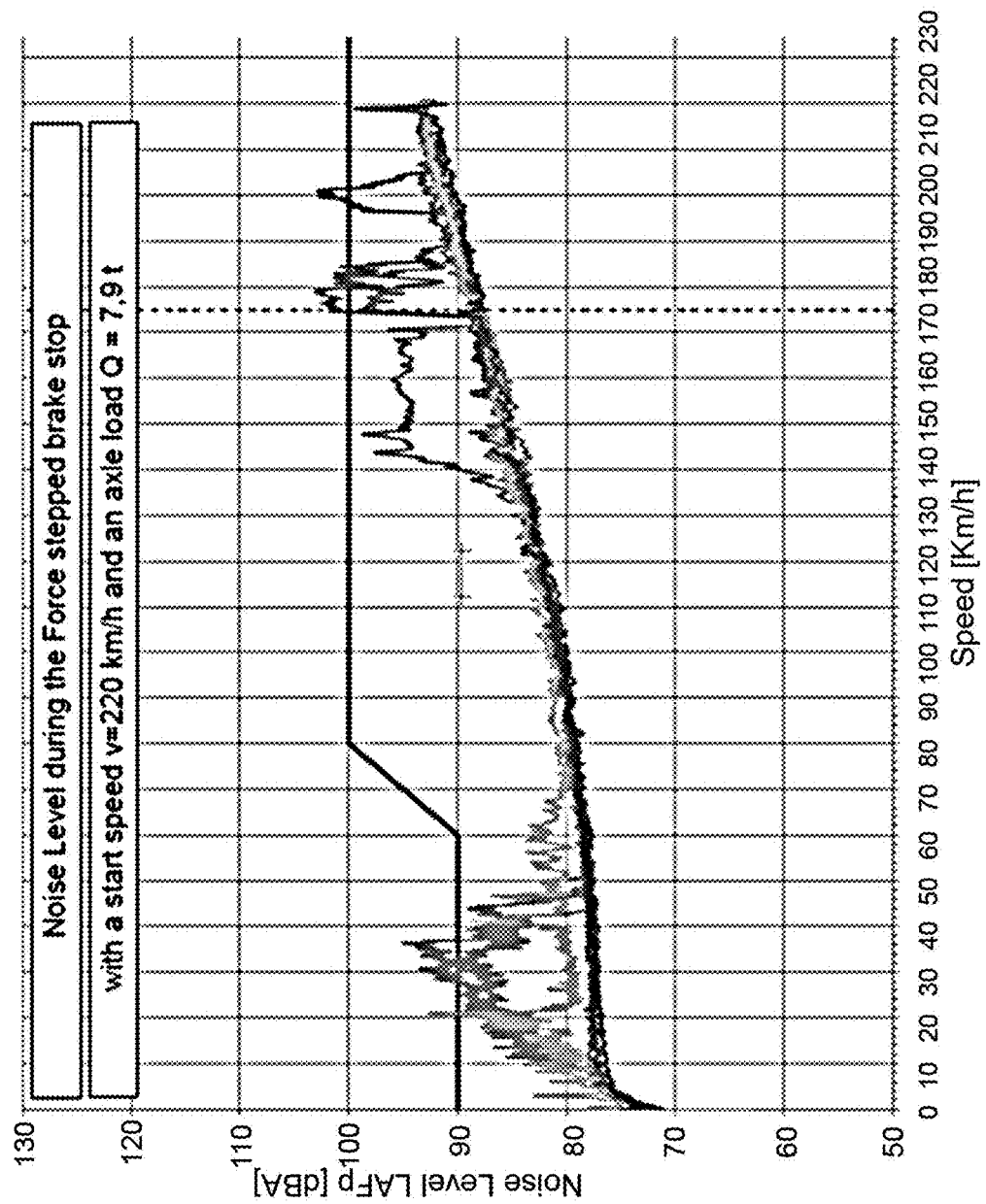
FIG. 3 is a graphic that records the noise results as a function of the speed relating to the pad in FIG. 1.

In FIG. 1, the reference number 1 indicates, as a whole, a pad for disc brakes according to this invention.

The pad 1 comprises a base plate 2, a dovetail attachment 3 attached to a rear surface of the base plate 2 and charged with attaching the pad 1 itself to a structure of the disc brake and multiple friction elements 4 attached to the base plate 2 and arranged so as to exert pressure on the brake disc to perform the braking action.

For the purposes of this invention, it is irrelevant whether the friction elements 4 may be attached to the plate 2 temporarily or permanently.

The friction elements 4 are arranged along the arched rows illustrated in dashed lines and indicated with reference number 5, which, in use, basically overlap with the concentric lines of a disk D on which the pad 1 acts. For simplicity's sake, the disk D is illustrated in dashed lines and only partially.

The friction elements 4 are divided into: five friction elements made of sintered material 4b and three friction elements made of organic material 4a. For clarity's sake, the friction elements made of organic material 4a are represented by a dashed surface.

The organic material of the friction elements 4a has a composition that meets the following conditions: from 5 to 30% by weight of rubber and resin, from 10 to 50% by weight of filler, from 5 to 20% by weight of graphite, and from 5 to 20% by weight of friction modifiers.

The organic material has a compressibility modulus of 7 MPa.

The sintered material of the friction elements 4b has a composition that meets the following conditions: from 10 to 70% by weight of copper, from 5 to 40% by weight of iron, from 5 to 20% by weight of graphite, from 1 to 10% by weight of friction modifiers.

The sintered material has a compressibility modulus of 27 MPa.

To measure the compressibility moduli, cylindrical samples were taken perpendicularly to the friction surface that had a diameter of 11.3 mm and a height equal to 10 mm. In this way, the cylinder obtained has a surface of 100 mm$^2$. The samples referred to above, were positioned below the test head of a (Galdabini QUASAR 100-type) traction/compression machine and an increasing force, with a speed of 7.45 daN/s, was applied. The compressibility modulus was calculated in MPa by normalising the compression curve detected on the basis of multiple significant points of the curve itself. The value obtained thus relating to 1 mm of compression was then divided by the area of the cylindrical sample (100 mm$^2$). In contrast to what is described above, the first and the second material may both be sintered materials or both organic materials, as long as they comply with the compressibility modulus conditions contained in the claims.

The materials with different compressibility moduli may be obtained, not only from materials with different chemical natures, but also via a different preparation process for the same chemical type of material.

For example, by changing the porousness of the resulting material, it is possible to change its compressibility.

In FIG. 2, the reference number 11 indicates, as a whole, a pad for disc brakes according to a comparison example.

The parts of the second pad 11 that are the same as those of the first pad 1 will be indicated with the same numbering and will not be described again.

The second pad 11 is differentiated from the first pad 1 due to the fact that all the friction elements 4 are friction elements made with sintered material 4b.

The first pad 1 and the second pad 11 were subjected to noise measurements during braking carried out according to the procedure indicated in the UIC 541-3 No. 5B (7th edition) standard and friction tests according to the procedure indicated in the standard UIC 541-3 No. 5B (7th edition).

Figure 4:
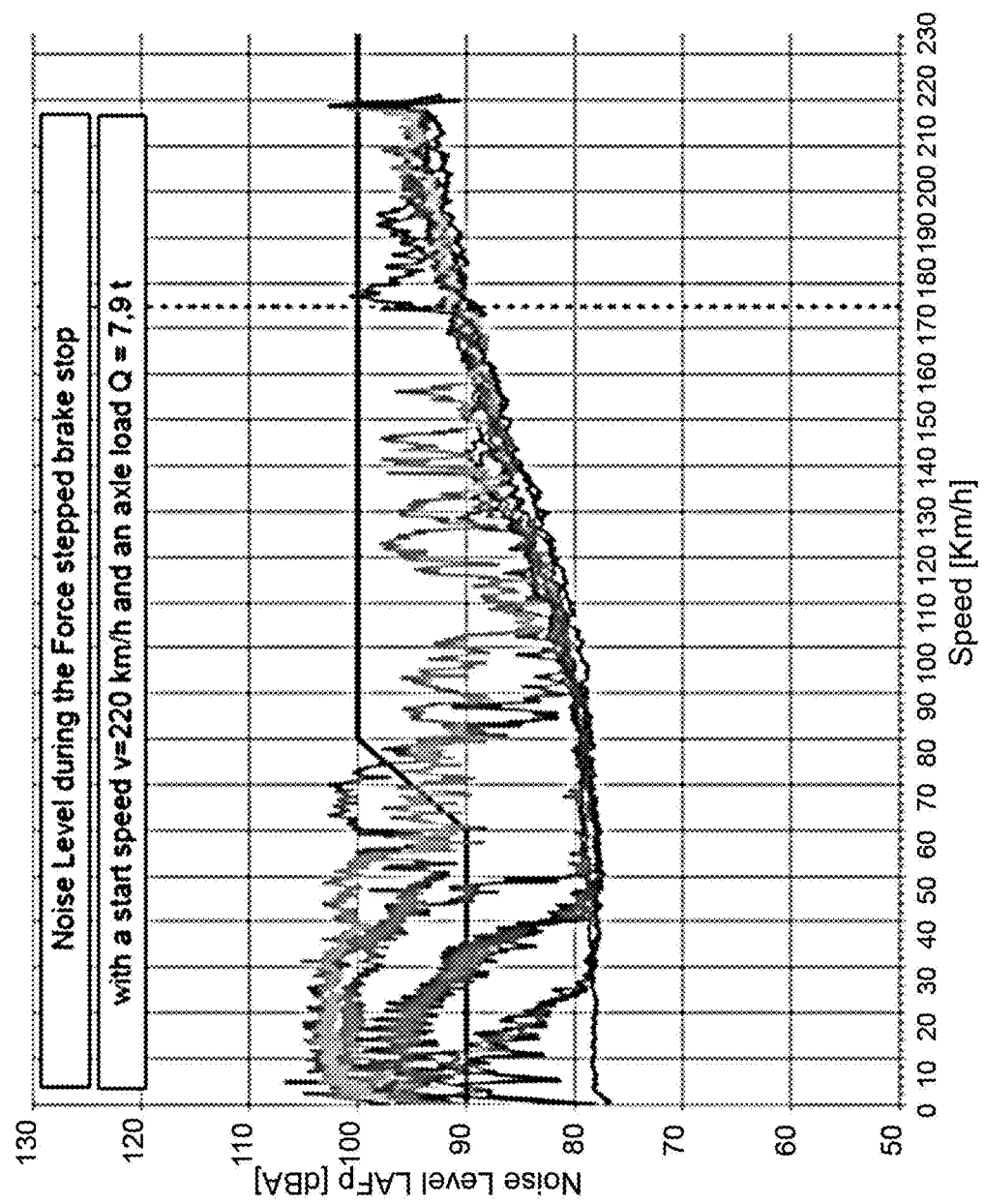
FIG. 4 is a graphic that records the noise results as a function of the speed relating to the pad in FIG. 2.

FIGS. 3 and 4 include graphics relating, respectively, to the noise tests carried out on pad 1 and on pad 11.

In each of the graphics, there are different curves made with different operating conditions relating to the application forces (pressure) of the pad on disk.

Of course, in the graphics in FIGS. 3 and 4, the curves represented in the same manner were produced with the same application force conditions.

In each of the graphics, there is an admissibility line, which indicates how up to a speed of 80 km/h a braking noise of up to 100 decibel is permitted, while below 60 km/h (the train is likely within the station) a braking noise of up to 90 decibel is permitted.

It is clear from FIGS. 3 and 4 how the pad that is the subject of this invention (graphic in FIG. 3) produces noise consistently below the admissibility line. In contrast, the comparison pad (FIG. 4 graphic), in the majority of operating conditions, produces noise above that indicated by the admissibility line for speeds below 60 km/h.

Figure 5:
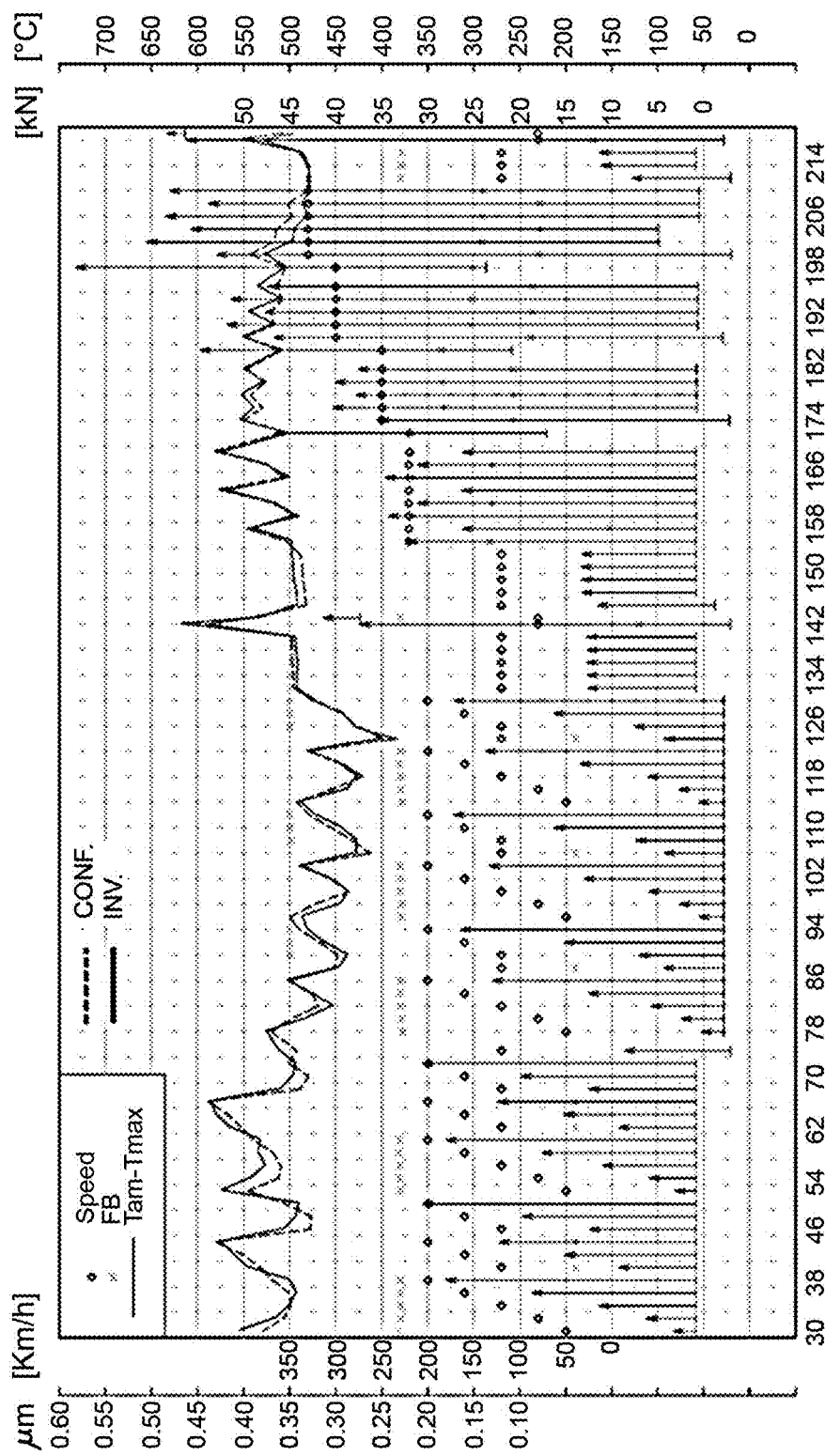
FIG. 5 is a graphic that records the results in terms of friction of the pads respectively in FIG. 1 and in FIG. 2.

The FIG. 5 graphic contains the friction values recorded on the pad of the invention (INV.) in FIG. 1 and on the comparison pad (CONF.) in FIG. 2 under different operating conditions (application force of the pad on the disk and speed).

From the FIG. 5 graphic, it is immediately clear how, surprisingly, the pad of the invention ensures the same performance in terms of friction as the comparison pad, despite some friction elements having a lower compressibility modulus. This result makes it possible to lower noise without affecting the efficacy of braking.

In addition, the majority presence of friction elements made with material with a higher compressibility modulus ensures less production of fine powders owing to the friction exerted during the braking action.

In summary, this invention relates to a pad for disc brakes, in which the presence of friction elements made with materials with different compressibility moduli is, surprisingly, able to reduce the noise produced during braking (comparison between FIGS. 3 and 4), without, as a result, encountering the drawbacks relating to low braking efficiency (FIG. 5) and a high production of fine powders.

The invention claimed is:

1. A disc brake comprising:
    a pad; and
    a disk on which the pad acts, the pad comprising a base plate and a plurality of friction elements fixed to the base plate, wherein each of the plurality of friction elements are configured to contact the disk and apply a braking force to the disk, wherein one or more friction elements of the plurality of friction elements being formed as first friction elements made of a first material and one or more different friction elements of the plurality of friction elements being formed as second friction elements made of a second material, the second material having a compressibility modulus that is at least 5 MPa less than the compressibility modulus of the first material, wherein there are more of the first friction elements than the second friction elements.

2. The disc brake according to claim 1, wherein the second material of the second friction elements has the compressibility modulus that is smaller than the compressibility modulus of the first material of the first friction elements by at least 10 MPa.

3. The disc brake according to claim 1, wherein the friction elements are arranged in arch-shaped rows that overlap with respective concentric lines of the disk on which the pad acts with each of the arch-shaped rows, each of the arch-shaped rows comprising one or more of the first friction elements and one or more of the second friction elements.

4. The disc brake according to claim 3, wherein each of the arch-shaped rows has at least as many of the one or more of the first friction elements as the second friction elements.

5. The disc brake according to claim 1, wherein the first material of the first friction elements has the compressibility modulus between 20 and 40 MPa, and the second material of the second friction elements has the compressibility modulus between 2 and 15 MPa.

6. The disc brake according to claim 1, wherein the first material of the first friction elements is a sintered material and the second material of the second friction elements is an organic material.

7. The disc brake according to claim 6, wherein the sintered material of the first friction elements has a composition composed of: from 10 to 70% by weight of copper, from 5 to 40% by weight of iron, from 5 to 20% by weight of graphite, and from 1 to 10% by weight of friction modifiers.

8. The disc brake according to claim 6, wherein the organic material of the second friction elements has a composition composed of: from 5 to 30% by weight of rubber and resin, from 10 to 50% by weight of filler, from 5 to 20% in graphite weight, and from 5 to 20% by weight of friction modifiers.

9. The disc brake for railway vehicles according to claim 1, wherein the compressibility modulus of the first material of the first friction elements represents an amount of pressure needed to compress the first material by 1 mm and the compressibility modulus of the second material of the second friction elements represents the amount of pressure needed to compress the second material by 1 mm.

10. A disc brake comprising:
a pad including a base plate and a plurality of friction elements fixed to the base plate, wherein each of the plurality of friction elements are configured to contact a disk and apply a braking force to the disk, wherein one or more friction elements of the plurality of friction elements being formed as first friction elements made of a first material and one or more different friction elements of the plurality of friction elements being formed as second friction elements made of a second material, the second material having a compressibility modulus that is smaller than the first material by at least a designated amount.

11. The disc brake of claim 10, wherein the pad includes more of the first friction elements than the second friction elements.

12. The disc brake of claim 10, wherein the designated amount is 5 MPa.

13. The disc brake of claim 10, wherein the designated amount is 10 MPa.

14. The disc brake of claim 10, wherein the friction elements are arranged in arch-shaped rows.

15. The disc brake of claim 14, wherein each of the arch-shaped rows includes one or more of the first friction elements and one or more of the second friction elements.

16. The disc brake of claim 14, wherein each of the arch-shaped rows has at least as many of the one or more of the first friction elements as the second friction elements.

17. The disc brake of claim 10, wherein the first material of the first friction elements is a sintered material or the second material of the second friction elements is an organic material.

18. A brake comprising:
a pad including a base plate and a plurality of friction elements coupled to the base plate, wherein the plurality of friction elements are configured to contact a disk and apply a braking force to the disk, each friction element being formed either as a first friction element made of a first material or as a second friction element made of a second material, the friction elements arranged in arch-shaped rows with each arch-shaped row including one or more first friction elements, the second material having a compressibility modulus that is smaller than the first material by at least 5 MPa.

19. The brake of claim 18, wherein the pad includes more of the first friction elements than the second friction elements.

20. The brake of claim 18, wherein the first material of the first friction elements is a sintered material and the second material of the second friction elements is an organic material.

* * * * *